United States Patent
Sadeghi et al.

(10) Patent No.: US 9,414,360 B2
(45) Date of Patent: Aug. 9, 2016

(54) MULTI-MODE DEVICE (MMD) MIDDLEWARE FOR CLOUD SPECTRUM SERVICES SPECTRUM ALLOCATION

(75) Inventors: Bahareh Sadeghi, Portland, OR (US); Srikathyayani Srikanteswara, Portland, OR (US); Carlos Cordeiro, Portland, OR (US); David M. Horne, Chandler, AZ (US); Reza Arefi, Great Falls, VA (US); Geoff O. Weaver, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 564 days.

(21) Appl. No.: 13/535,460

(22) Filed: Jun. 28, 2012

(65) Prior Publication Data

US 2013/0273881 A1    Oct. 17, 2013

Related U.S. Application Data

(60) Provisional application No. 61/603,261, filed on Apr. 11, 2012.

(51) Int. Cl.

| | |
|---|---|
| *H04M 1/00* | (2006.01) |
| *H04W 72/04* | (2009.01) |
| *H04W 16/14* | (2009.01) |
| *H04W 4/24* | (2009.01) |
| *H04W 24/08* | (2009.01) |
| *H04W 28/16* | (2009.01) |
| *H04L 12/24* | (2006.01) |
| *H04W 16/10* | (2009.01) |
| *H04W 72/12* | (2009.01) |
| *H04W 76/02* | (2009.01) |
| *H04W 74/00* | (2009.01) |
| *H04W 88/06* | (2009.01) |

(52) U.S. Cl.
CPC ........... *H04W 72/04* (2013.01); *H04L 41/0896* (2013.01); *H04W 4/24* (2013.01); *H04W 16/10* (2013.01); *H04W 16/14* (2013.01); *H04W 24/08* (2013.01); *H04W 28/16* (2013.01); *H04W 72/0486* (2013.01); *H04W 72/0493* (2013.01); *H04W 72/1257* (2013.01); *H04W 74/002* (2013.01); *H04W 76/02* (2013.01); *H04W 88/06* (2013.01)

(58) Field of Classification Search
CPC ...... H04W 88/06; H04W 36/12; H04W 48/17
USPC .................................... 455/406, 553.1, 552.1
See application file for complete search history.

(56) References Cited

U.S. PATENT DOCUMENTS

2006/0167703 A1\* 7/2006 Yakov ............................... 705/1
2007/0253466 A1\* 11/2007 Jones et al. .................. 375/131

*Primary Examiner* — Joshua Schwartz
(74) *Attorney, Agent, or Firm* — Ellis B. Ramirez; Prass LLP

(57) ABSTRACT

A platform to facilitate transferring spectrum rights is provided that includes a database to ascertain information regarding available spectrum for use in wireless communications. The invention provides a middleware component usable in a mobile terminal device such as a multi-mode device, where the middleware component mediates between an application program and network interfaces and/or hardware to manage the interaction between the device and a cloud spectrum service. The middleware component coordinates scanning for available broadcast, multicast, and/or conditional access platforms, networks, and/or services, as well as maintaining connection with CSS network elements to enable flexible and optimal use of the spectrum and manages the resources among multiple radios and applications on the platform.

10 Claims, 5 Drawing Sheets

MULTI-MODE DEVICE (MMD) MIDDLEWARE FOR CLOUD SPECTRUM SERVICES SPECTRUM ALLOCATION

This application claims priority to U.S. Provisional Application No. 61/603,261 entitled "INTELLIGENT SPECTRUM ALLOCATION BASED ON USER BEHAVIOR PATTERNS FOR EFFICIENT SPECTRUM USAGE," filed Febuary 25, 2012, the entire disclosure of which is incorporated herein by reference in its entirety.

BACKGROUND

1. Field of the Disclosed Embodiments

The present invention relates generally to wireless communications and more particularly to a method and apparatus for dynamic spectrum allocation in multiple coexisting wireless networks.

2. Introduction

Service providers and device manufacturers (e.g., wireless, cellular, etc.) are continually challenged to deliver value and convenience to consumers by, for example, providing compelling network services. Numerous organizations have forecast significant mobile broadband traffic growth over the coming 5-10 years worldwide. On average, those forecasts approach 80% compound annual growth rate. This high traffic growth leads to the conclusion that spectrum (current and planned) targeted for exclusive licensing by mobile broadband carriers could be exhausted before the end of the decade. On the other hand, in spite of the potential spectrum scarcity problem, spectrum utilization measurements in most countries, worldwide, have shown that there is a large amount of underutilized spectrum in the 300 MHz to 6 GHz range.

The conventional strategy of fixed spectrum management is to issue a spectrum license to a specific Radio Access Technology (RAT) to enable the specific RAT to occupy the spectrum exclusively. However, such a manner of spectrum management is unable to adapt to the changing of spectrum demands dynamically in space and time, and it hence leads to uneven spectrum utilization and artificial spectrum shortage.

Industry and regulatory agencies are aware of these facts and issues, and are thereby trying to adopt more flexible and dynamic regulatory framework to enable spectrum sharing or access, which is called Dynamic Spectrum Sharing (DSS) and Dynamic Spectrum Access (DSA), respectively. DSS and DSA may enable a secondary user or spectrum holder in need of spectrum availability to use spectrum assigned to, or owned by, a primary user or spectrum holder without any harmful interference.

Cloud Spectrum Services (CSS) is a framework for Dynamic Spectrum Sharing (DSS) and Dynamic Spectrum Access (DSA) using the cloud for spectrum management that provides optimum spectrum allocation through dynamic spectrum rentals. At the heart of the CSS framework there is a CSS database and a broker that manages and optimizes the allocation based on various inputs like device capability, base station capability, spectrum availability and user needs, user movement and the like.

Some Example Embodiments

Therefore, there is a need for an approach for managing dynamic sharing of available spectrum services. In these embodiments there is proposed middleware architecture and software to provide functionality for flexible and optimal use of spectrum on client devices. Further, through the use of dynamic spectrum allocation the middleware on the device delivers a better user experience by implementing smart context aware algorithms. Implementing a smart context algorithm the middleware learns patterns in over time and uses that to optimize spectrum allocation. Intelligent learning of user behavior and predictive models is not currently found in the Dynamic Spectrum Sharing (DSS) and Dynamic Spectrum Access (DSA) fields.

According to one embodiment, a method of operating a multi-mode device comprising managing, with a middleware unit in the multi-mode device (MMD), dynamic spectrum access transaction state by forming a context aware usage profile for the MMD so as to consume one or more broadcast services in a broadcast network.

According to another embodiment, a non-transitory machine-accessible medium that provides instructions, which when accessed, cause a machine to perform operations comprising maintaining a database operable to store information associated with at least one spectrum asset, wherein the stored information includes dynamic spectrum availability from spectrum holders advertising their spectrum for rent; apportioning the spectrum for rent in response to a request for spectrum from a middleware unit at a multi-mode device (MMD); operating the multi-mode device (MMD) by forming a context aware usage profile for the MMD so as to consume the apportioned spectrum for rent.

According to another embodiment, a multi-mode device (MMD) comprising, a middleware unit, accessible by an application configured to consume one or more broadcast services in a broadcast network, to manage dynamic spectrum access transaction state for the multi-mode device.

Exemplary embodiments are described herein. It is envisioned, however, that any system that incorporates features of any apparatus, method and/or system described herein are encompassed by the scope and spirit of the exemplary embodiments.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
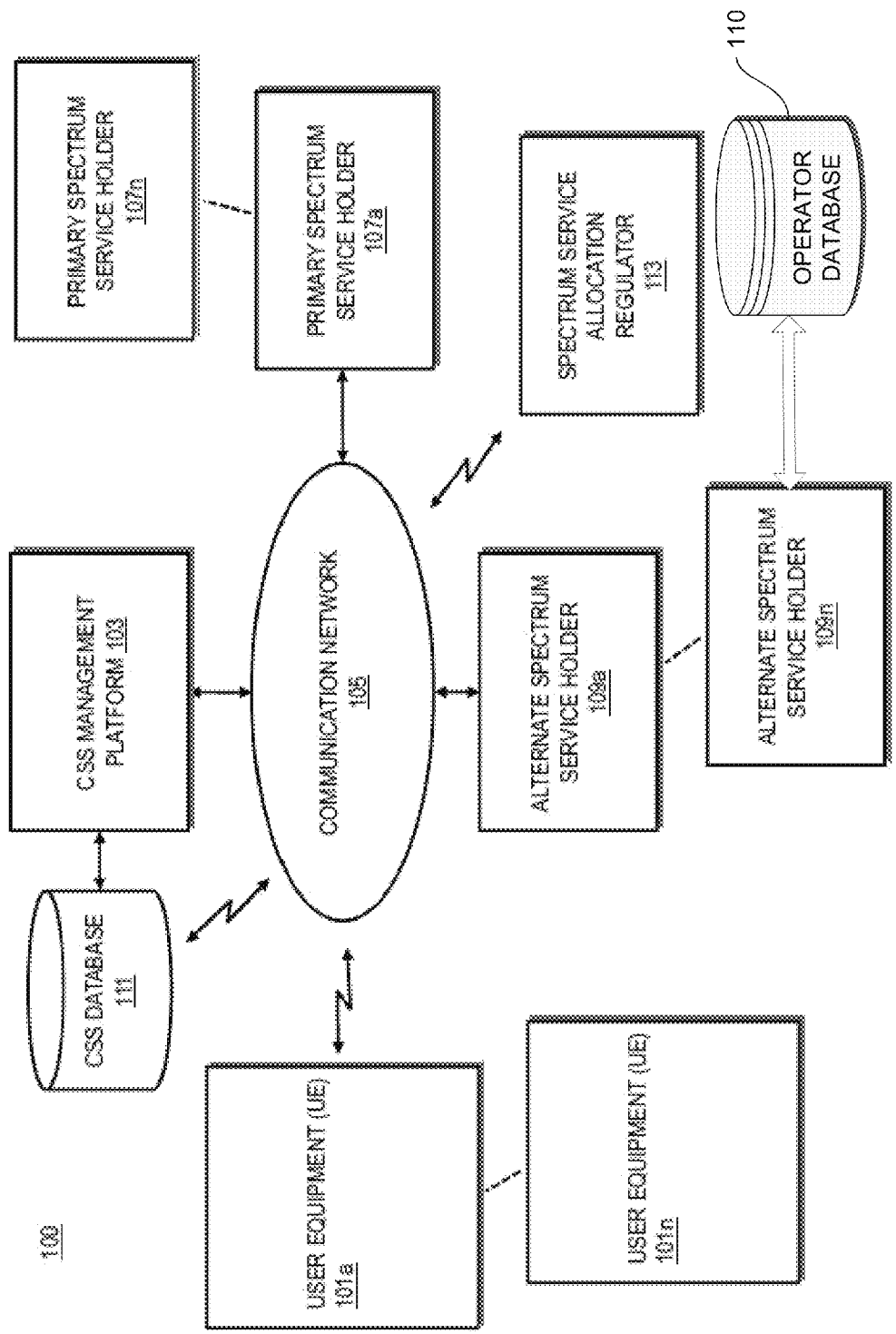
FIG. 1 is a diagram of a system capable of managing dynamic sharing of available spectrum services, according to one embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "spectrum asset" is a right to use, usually in a specific geographic area, a range of electromagnetic radiation, from the highest frequency to the lowest. The spectrum encompasses everything from X-rays and gamma rays to visible light and radio waves. Additionally, the spectrum asset can be reduced to a set of time slots selected from a group consisting of hours, days, time blocks, minutes, and seconds or to a frequency range that is also reducible to a set of time slots.

The term "Cloud Spectrum Services (CSS)" is used herein to refer to a dynamic spectrum rental scheme that uses a cloud-based database and optimization engine to allocate available spectrum to client devices.

The term "Multi-mode device (MMD)" is used herein to primarily refer to a user equipment (UE) such as a wireless device to transmit and/or receive data to/from a fixed network infrastructure, and includes for example a mobile device, tablet, computing device, TV sets, hand held (HH) device. An MMD could also be capable of directly using spectrum resources assigned by a Cloud Spectrum Broker CSB. An MMD can engage in wired or wireless communication with other devices.

As used herein the terms "lease" and "rent" are synonymous.

The term "Primary Spectrum Holder (PSH)" in the context of a cloud spectrum services (CSS) transaction, is a spectrum owner with rights conveyed by a regulatory authority to a portion of the radio spectrum that will be dynamically managed by a CSB and reallocated for temporary use to MMDs and/or Alternate Spectrum Holders (ASHs). Examples include TV broadcasters, cellular operators, and government agencies (military, public safety, and the like).

The term "Alternate Spectrum Holder (ASH)" as used herein is any operator or entity which provides MMDs with access to a fixed network infrastructure. Examples include cellular operators and government agencies. In Cloud Spectrum Services (CSS) an ASH is a user that can request spectrum from a cloud spectrum broker.

The term "Cloud Spectrum Service Database (CSD)" is used herein to refer to a device to Store data that are used by a CSB to dynamically manage the spectrum asset such as a radio spectrum resource, i.e., spectrum availability at a given time in a given location. The CSD can be deployed by a third party or as part of an ASH or PSH network.

The term "Content Provider (CP)" is used herein to refer to Content providers such as ESPN, Netflix, Hulu, Disney and Amazon. A CP may establish service agreements directly with MMDs and uses the services of a CSB to ensure reliable delivery of content to MMDs across any communication infrastructure such as wireless media. In Cloud Spectrum Services (CSS) a CP is a user that can request spectrum from a cloud spectrum broker.

The term "Cloud Spectrum Broker (CSB)" refers to the entity, such as a CSS management platform, responsible for managing CSS transactions and for optimizing the use of the spectrum asset like a radio spectrum resource across a geographical area on the basis of parameters such as PSH offerings, ASH requirements and requests, MMD capabilities and requests, CP offerings and requirements, and application requirements.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like. In some embodiments, a wireless device may be or may include a peripheral device that is integrated with a computer, or a peripheral device that is attached to a computer. In some embodiments, the term "wireless device" may optionally include a wireless service.

As used herein, the term "network" is used in its broadest sense to mean any system capable of passing communications from one entity to another. Thus, for example, a network can be, but is not limited to, a wide area network, a WiFi network, a cellular network, and/or any combination thereof.

The term "broadcast service" as used herein refers to communication using one or more wireless standard selected from a group consisting of IMT standards (IMT-2000, IMT-Advanced) and their evolution, IEEE 802.11, IEEE 802.15, IEEE 802.16, IEEE 802.20, UMTS, GSM 850, GSM 900, GSM 1800, GSM 1900, GPRS, operating in non-IMT bands.

FIG. 1 is a diagram of a system 100 capable of managing dynamic sharing of available spectrum services, according to one embodiment. System 100 is capable of managing dynamic sharing of available spectrum services. For instance, the system 100 addresses the need for interfaces and protocols that enable communications among entities such as primary spectrum holders, alternate spectrum holders, spectrum brokers or management services, and/or regulatory agencies to facilitate dynamic sharing of available spectrum services by way of a cloud interface.

There are four major stakeholders in CSS: 1) a primary spectrum holder having an exclusive right to use a specific spectrum service, 2) an alternate spectrum holder, e.g. a cellular or mobile broadband operator or service provider that may need to rent or borrow pieces of the spectrum owned or assigned to the primary spectrum holder, 3) a regulatory agency that manages spectrum allocation and/or authorizes a renting or sharing deal between the primary spectrum holder and the alternate spectrum holder, and 4) a spectrum broker or management service that manages CSS transactions performed in the CSS cloud.

As shown in FIG. 1, the system 100 comprises user equipment (UE) 101a-101n (collectively referred to as UE 101) having connectivity to a CSS management platform 103 or CSB, one or more primary spectrum holder s 107a-107n (collectively referred to as primary spectrum holder 107), one or more alternate spectrum holder s 109a-109n (collectively referred to as alternate spectrum holder 109), a CSS database 111, and one or more a spectrum service allocation regulators (collectively referred to and illustrated as spectrum service allocation regulator 113) via a communication network 105. While all of the UE 101, CSS management platform 103, primary spectrum holder 107, alternate spectrum holder 109, CSS database 111 and spectrum service regulator 113 are all illustrated as having connectivity to the communication network 105, each of these features may or may not have direct connectivity to one another, according to various embodiments and system architectures.

According to various embodiments, the CSS management platform 103 may be operated by a spectrum broker or management service and be operatively connected to, or include, the CSS database 111 such as cloud spectrum database (CSD). The CSS management platform 103 may also be configured to store various computational resources to perform CSS transactions in the CSS database 111 or in another memory associated with the CSS management platform 103.

According to various embodiments, the infrastructure of the alternate spectrum holder 109 may be a radio access network (RAN) and/or a core network that has a capability to use various available spectrum services provided by the primary spectrum holder 107 as rental spectrum, for example. Additionally, the UE 101 may be a CSS-capable multi-mode device (MMD), for example, capable of using various available spectrum services provided by the primary spectrum holder 107.

In one or more embodiments, there may be any combination of one or more of the following four logical interfaces. For example, a first interface is defined between the primary spectrum holder 107 and the CSS database 111. A second interface is defined between the alternate spectrum holder 109 and the CSS management platform 103. A third interface is defined between the CSS management platform 103 and the CSS database 111. A fourth interface is defined between the primary spectrum holder 107 and CSS management platform 103.

According to various embodiments, depending on CSS architecture, there may also, or alternatively, be other logical interfaces defined between the CSS management platform 103 and the UE 101, and/or the spectrum service allocation regulator 113. Or, the spectrum service allocation regulator may directly interface with the primary spectrum holder 107.

In one or more embodiments, the primary spectrum holder 107 provides the CSS management platform 103 and/or the CSS database 111 directly or by way of the CSS management platform 103 information, for instance, regarding which spectrum services such as radio resources are available for a particular period of time on a dynamic basis. The information regarding available spectrum services provided by the primary spectrum holder 107 is accordingly stored in the CSS database 111.

According to various embodiments, the alternate spectrum holder 109 or the UE 101 provides the CSS management platform 103 via an interface with one or more spectrum sharing requests regarding spectrum renting. For example, if the alternate spectrum holder 109 or the UE 101 determines that additional spectrum services are needed beyond those currently available to the alternate spectrum holder 109 or the UE 101 or estimated as being available in the future to the alternate spectrum holder 109 or the UE 101, the alternate spectrum holder 109 or the UE 101 makes a request for spectrum sharing that is sent to the CSS management platform 103 so that a need for current or future spectrum services may be satisfied.

For example, the request for spectrum sharing may specify various service criteria or details regarding the request such as, but not limited to, one or more of a period of time during which the requested spectrum sharing is to occur, a price offering range for the requested spectrum sharing, a frequency range within which the requested spectrum sharing is allowed to occur, a performance requirement associated with the source of the request for spectrum sharing, and a spectrum holder with which the requested spectrum sharing is allowed to occur.

The primary spectrum holder 107, along with the information regarding which spectrum services are available, may indicate various spectrum sharing criteria to CSS management platform 103 regarding renting conditions including, but not limited to, an asking price for sharing an available spectrum service, a performance data of the available spectrum service, a frequency range of the available spectrum service, and a spectrum sharing requestor with which the available spectrum service is allowed to be shared.

Based on a receipt of a request for spectrum service sharing, the CSS management platform 103 obtains information stored in the CSS database 111, and analyzes the alternate spectrum holder 109's or the UE 101's requests for spectrum sharing, and may also consider any regulatory rules that are provided by the spectrum service allocation regulator 113 to cause an allocation of one or more available spectrum services to the alternate spectrum holder 109 or the UE 101.

For example, the CSS management platform 103 may compare the various spectrum sharing criteria set by the primary spectrum holder 107 with the service criteria provided by the alternate spectrum holder 109 or the UE 101. Based on this comparison, the CSS management platform 103 may determine whether a particular available spectrum service should be shared with the requesting alternate spectrum holder 109 or the UE 101. The determination to share the available spectrum service may be based, for example, on a matching between the spectrum sharing criteria stored in the CSS database 111 and the service criteria provided by the alternate spectrum holder 109 or the UE 101. The matching may be based on an optimization routine associated with pairing the various spectrum sharing criteria and the various service criteria, for example. Then, based on the matching, a decision to share an available spectrum service stored in the CSS database 111 may be made and the available spectrum service may be allocated to the alternate spectrum holder 109 or the UE 101.

For example, if a primary spectrum holder 107 only wants to enable sharing/renting of its available spectrum services to certain competitor carriers at particular times, the CSS management platform 103 causes a decision to share available spectrum services to be made in accordance with that particular combination of spectrum sharing criteria. Or, for example, if a primary spectrum holder 107 will only rent or share its available spectrum services for a particular minimum price, the CSS management platform 103 will only match an alternate spectrum holder 109 or UE 101 that has a price offering that meets the asking price provided in the spectrum sharing criteria. According to various embodiments, the CSS management platform 103 may be configured to maximize the revenue produced by sharing available spectrum services. For example, if an alternate spectrum holder 109 or a UE 101 provides service criteria including a price offering or a price range that exceeds the asking price for spectrum rental, the CSS management platform 103 will allocate the available spectrum services to the highest bidder (assuming multiple bidding alternate spectrum holder s 109 or UE 101's, for example) and/or, if there is only one bidding entity, will allocate the available spectrum service at the maximum of the offered range, rather than at the asking price which may be lower than the offered range.

In one or more embodiments, the various spectrum sharing criteria and/or the service criteria may be weighted such that certain criteria is more important than other criteria, so that the decision to share spectrum services may be based on a weighted matching. For instance, if a spectrum sharing criteria is set to be limited to a particular time has a weighting of "X", but a price point for spectrum sharing is set as "Y" which is more heavily weighted than X, and a particular price point offered by the alternate spectrum holder 109 or the UE 101 causes the timing limit to be overridden, the CSS management platform 103 may cause a decision to share the available spectrum service based on the price offering even though the primary spectrum holder 107 would normally not allow spectrum sharing during the time at which the request for sharing spectrum services is made or the time at which the spectrum sharing is to occur. In other words, if a primary spectrum holder 107 does not want to share spectrum services with a competitor such as alternate spectrum holder 109 or UE 101 during peak hours, the primary spectrum holder 107 may do so if the price is right.

It should be noted that the above examples are merely exemplary regarding potential matching, alignment, weighting, optimization and/or reasoning for comparing and matching an alternate spectrum holder 109 or UE 101 with an available spectrum service provided by primary spectrum holder 107. Any type of data or criteria, combination, or weighting scheme for spectrum sharing and/or service criteria may be provided to the CSS management platform 103 for consideration when making a determination to share available spectrum services and when allocating available spectrum services to an alternate spectrum holder 107 and/or a UE 101.

Additionally, the CSS management platform 103 may consider any regulatory rules provided by the spectrum service allocation regulator 113, or rules could be integrated into CSS database 111, when determining to share the available spectrum service with the requesting alternate spectrum holder 109 or the UE 101. For example, any regulatory rules that govern allocation of spectrum services by way of rental, borrowing, sharing, etc. may be considered when the CSS management platform 103 optimizes the matching of spectrum sharing criteria and service criteria, or the CSS management platform 103 may apply the regulatory rules after a determination to share the available spectrum services is made and the regulatory rules are applied to approve or disapprove of the decision to share the available spectrum services and/or the allocation of the available spectrum services to the alternate spectrum holder 109 or the UE 101.

In one or more embodiments, the CSS management platform 103 updates the CSS database 111 regarding the allocation of the available spectrum services to the alternate spectrum holder 109 or the UE 101. The CSS management platform 103 may also advise the alternate spectrum holder 109 or the UE 101 of a decision on their request for spectrum sharing by way of a notification message. The notification message may include specific details regarding the decision to share the available spectrum service and/or the allocation such as price paid, price to be paid, time for the allocation, frequency allocation, primary spectrum holder details, etc.

The CSS management platform 103 may also report the allocation of the available spectrum service to the primary spectrum holder 107 by way of a notification message. The notification message may include specific details regarding the decision to share the spectrum service and/or the allocation such as price paid, price to be paid, time for the allocation, frequency allocation, primary spectrum holder details, etc.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, CSS management platform 103, primary spectrum holder 107, alternate spectrum holder 109, and optionally CSS database 111 and spectrum service allocation regulator 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an inter-network (layer 3) header and a transport (layer 4) header, and various application (layer 5, layer 6 and layer 7) headers as defined by the OSI Reference Model.

Figure 2:
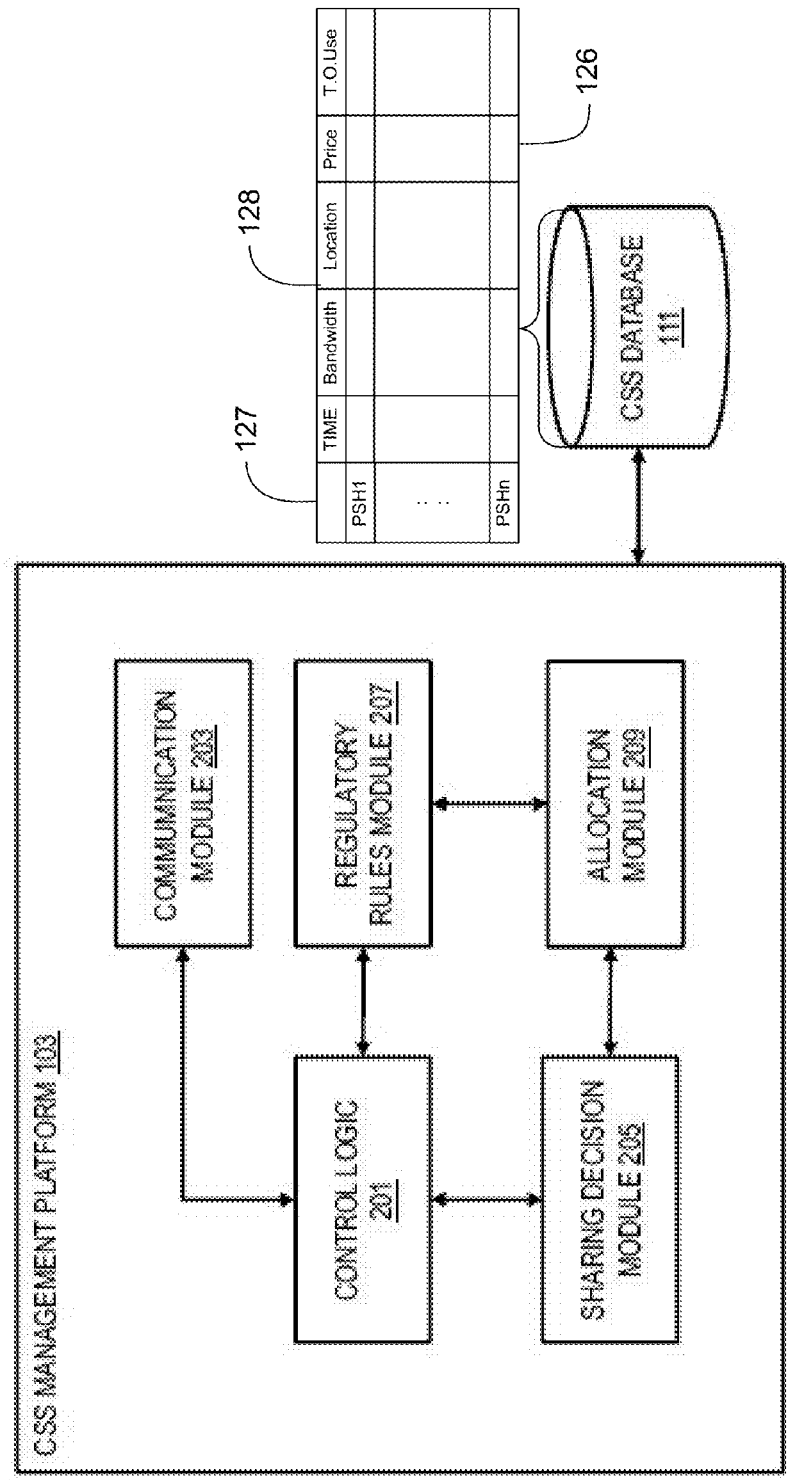
FIG. 2 is a diagram of the components of a cloud spectrum services management platform, according to one embodiment.

FIG. 2 is a diagram of the components of a cloud spectrum services management platform 103, according to one embodiment. FIG. 2 is a diagram of the components of CSS management platform 103, according to one embodiment. By way of example, the CSS management platform 103 includes one or more components for managing a dynamic sharing of available spectrum services. It is contemplated that the functions of these components may be combined in one or more components or performed by other components of equivalent functionality. In this embodiment, the CSS management platform 103 includes a communication module 201, a control logic 203, a sharing decision module 205, a regulatory rules module 207, an allocation module 209, and optionally the CSS database 111, discussed above.

According to various embodiments, the CSS management platform 103 receives information regarding one or more available spectrum services provided by the primary spectrum holder 107 by way of the communication module 201. The control logic 203 causes the information regarding the one or more available spectrum services to be stored in the CSS database 111. A request for spectrum sharing may be received by the communication module 201. Upon receipt of the request for spectrum sharing, the control logic 203 instructs the sharing decision module 205 to assess any information associated with the request for spectrum sharing such as service criteria discussed above and/or the source of the request for spectrum sharing such as alternate spectrum holder 109 or UE 101. The sharing decision module 205 accordingly compares the information associated with the request for spectrum sharing with any information associated with the available spectrum services stored in the CSS database 111 such as, but not limited to, any spectrum sharing criteria and/or any regulatory rules managed by the regulatory rules module 207 to determine to share one or more of the available spectrum services with the source of the request for spectrum sharing.

As discussed above, the decision to share spectrum services may be made inclusive of any available regulatory rules or be made before any regulatory rules are applied to verify a decision to share the available spectrum services. Upon making a decision to share one or more available spectrum services, the control logic 203 causes the allocation module 209 to facilitate sharing of the available spectrum services by allocating one or more available spectrum services to the source of the request for spectrum sharing, i.e. the alternate spectrum holder 107 or the UE 101.

Upon allocating the available spectrum services to the source of the request for spectrum sharing, the allocation module 209 notifies one or more of the primary spectrum holder 107 and the alternate spectrum holder 109 or the UE 101 that the allocation has occurred and may also indicate various details related to the decision to share the one or more available spectrum services such as price, time, provider, etc. by way of the communication module 201. Additionally, the allocation module 209 causes the CSS database 111 to be updated to reflect the allocated spectrum services. CSS database 111 receives dynamic spectrum availability information from the PSH identifying the primary holder and spectrum asset descriptors such as time, bandwidth, terms of use, price, and location. The availability information may be formatted to any suitable database structure and may be stored by a memory. A tabular form of the spectrum availability information is shown as table 126. The table 126 lists the primary spectrum holder 127 and the spectrum asset descriptors 128.

Figure 3:
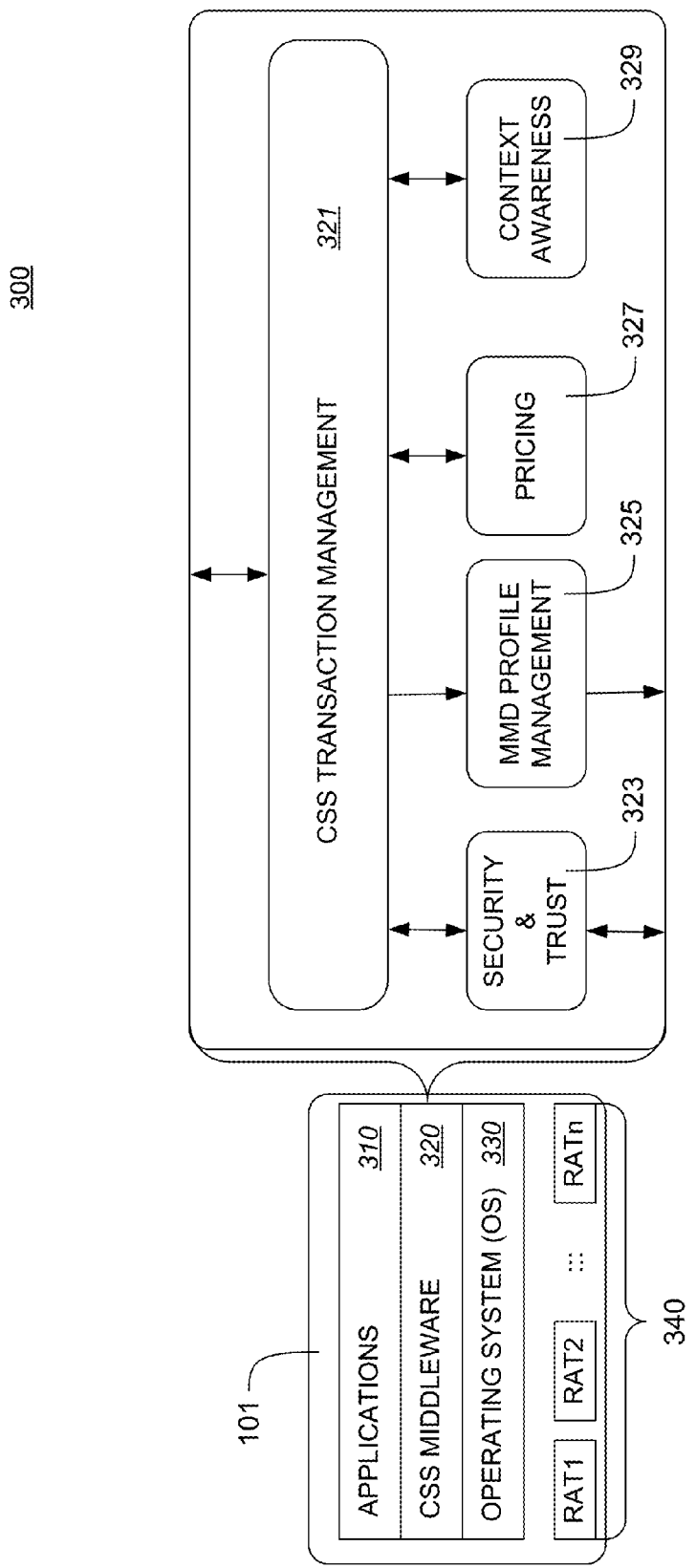
FIG. 3 is a diagram of a cloud spectrum service (CSS) enabled multi-mode device with CSS middleware in accordance to an embodiment.

FIG. 3 is a diagram of a cloud spectrum service (CSS) enabled multi-mode device 300 with CSS middleware in accordance to an embodiment. The multimode device is a general-purpose wireless device. A multi-mode wireless device supports multiple radio access technologies (RATs) and typically operates on multiple frequency bands. As a first example, a wireless device might support Global System for Mobile communications/General Packet Radio Service/Enhanced Data rates for GSM Evolution (GSM/GPRS/EDGE), Universal Mobile Telecommunications System/High-Speed Packet Access (UMTS/HSPA), and Code Division Multiple Access (CDMA). The multi-mode device such as UE 101 comprises applications 310, CSS middleware 320, operating system 330, and a collection of radio access technology (RAT1 . . . RATn) 340 to facilitate communication with servers and clients. While not shown the MMD could have keypad, display, graphical user interface (GUI), CPU, memory, RF adapter, and bus to facilitate exchange of data. Middleware generally refers to a communications layer that allows applications to interact across hardware and network environments.

The context awareness component 329 makes it possible for programs and services (applications) to react specifically to their current location, time and other environment attributes and adapt their behavior to changing circumstances as context data changes. The needed context information may be retrieved in a variety of ways such as applying sensors, device information, user demographics, device/user interactions, network information, location data such as from a global positioning system (GPS), device status, browsing user profiles, and using other sources. For example, during device operation the physical operating environment or the physical location of the device may change causing the data and/or services to change. Data and services may change due to the time of day, or based on how the user interacts with the device and the mobile application. In another example, the occurrence of an event may impact the operation of the device. For instance, power outages, increases in Internet traffic, or changes in environmental conditions may occur.

Middleware may also refer to a piece of software that sits between two or more types of software and translates information between them, or to software that mediates between an application program and a network to manage the interaction between disparate applications across heterogeneous platforms. CSS Middleware component 320 may coordinate communication, data, messages, and user interaction between hardware of a multi-mode device and one or more broadcast experience applications executing on the multi-mode device as directed by a user of the multi-mode device. Middleware component interprets and binds together different subsystems and applications in the multi-mode device to enhance a user's broadcast and/or multicast, conditional access, and the like reception experience.

CSS middleware 320 comprises components such as CSS transaction management 321, security and trust 323, MMD profile management 325, pricing 327, context awareness 329, and other components that maintain connection with CSS network elements to enable flexible and optimal use of the spectrum and manages the resources among multiple radios and applications on the platform.

The CSS middleware 320 architecture enables a multi-mode device or cloud spectrum (CS) enabled client to carry out the following functions: Managing a CSS transaction state from the context of an MMD, which includes communication with the Cloud Spectrum Broker (CSB) and Cloud Spectrum Database (CSD), requesting, advertising and releasing of time-frequency unit (TFU) availability windows. Setting the bidding price per TFU for each TFU availability window requested by the MMD.

Observing and inferring user's usage habits and preferences and form a context aware usage profile for the MMD. Functioning as a trusted broker including interfacing with the user for negotiation or confirmation of the price or transaction for spectrum. Reconfiguring the MMD and corresponding RAT upon allocation and release of a TFU availability window; ensuring cease of spectrum use upon receipt of corresponding signaling. Facilitating spectrum handoff during a data session, an MMD may be reassigned to a new TFU availability window. Further, this availability window can be under the same RAT or a different RAT. In this scenario, the CSS middleware is responsible for managing and maintaining the data session transfer during the spectrum handoff. Negotiating resource allocation with applications running on MMD on the basis of traffic priority.

Figure 4:
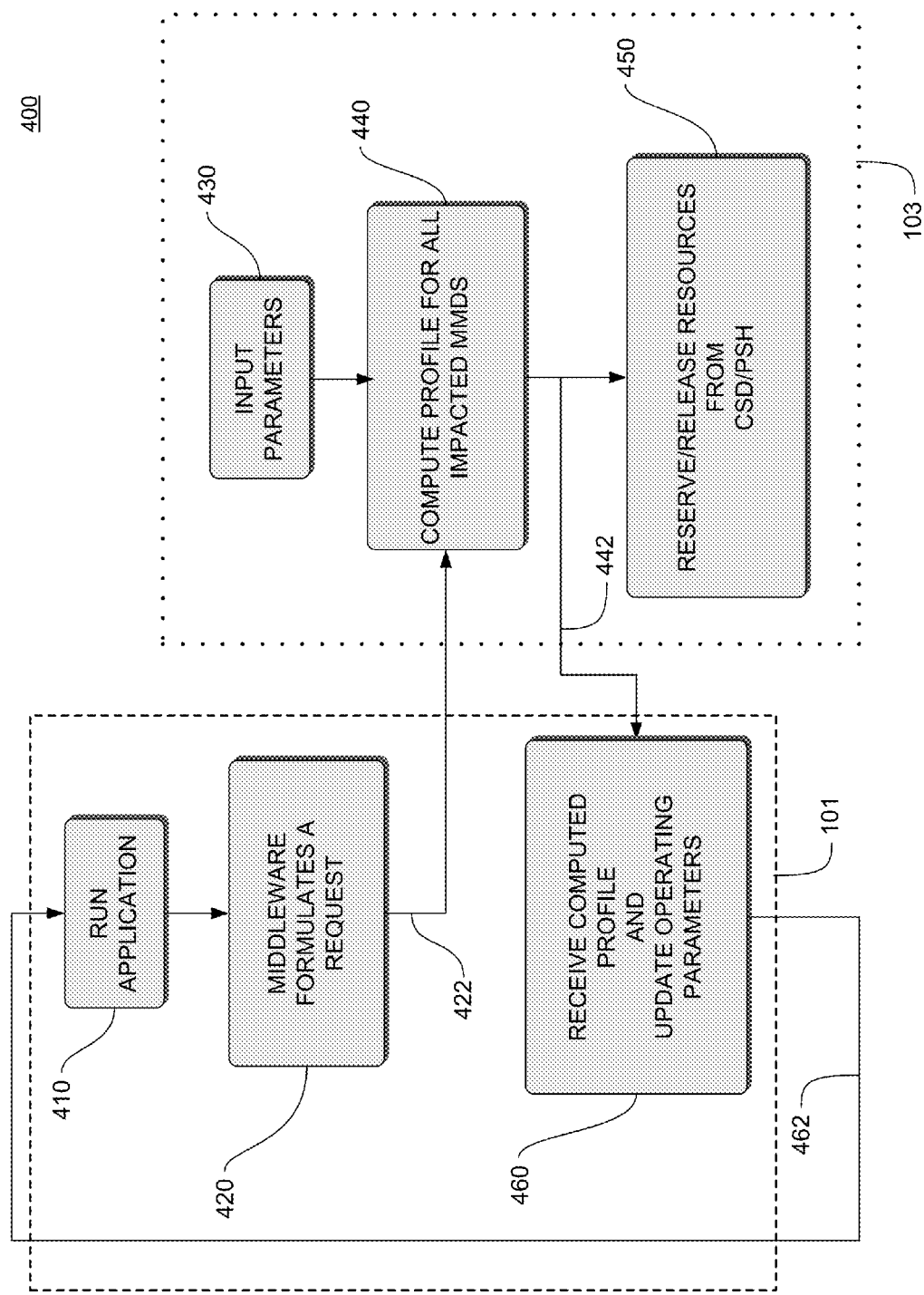
FIG. 4 is a flowchart of a method of an MMD initiated transaction in accordance to an embodiment.

FIG. 4 is a flowchart of a method 400 of an MMD initiated transaction in accordance to an embodiment. Method 400 comprises actions that can be performed at the MMD such as UE 101 and at the cloud broker (CB) 103. Method 400 begins with action 410 at the multi-mode device by the MMD running or invoking an application such as a request for spectrum or request to consume one or more broadcast services in a broadcast network such as communication network 105. In action 420 the CSS middleware formulates a request for spectrum. The request is forwarded 422 to the cloud spectrum broker for processing. At the cloud spectrum broker a set of input parameters concerning spectrum that is available or may be available from a primary spectrum holder is maintained in storage such as a database. The available input parameter comprises spectrum information such as time, bandwidth, location, term of use, and the like. In action 430 input parameters are retrieved from a storage device and used with the request from the MMD to compute in action 440 an MMD profile for all impacted MMDs. The CSB sends 442 the resulting profile to each impacted MMD. The computed profiles are forwarded to action 450 for further processing. In action 450, a reservation or release of resources from the cloud spectrum database (CSD) or from the primary spectrum holder (PSH) is undertaken by the cloud spectrum broker. In action 460 the CSS middleware receives the computed MMD profile and updates operating parameters. The operating parameters can then be used to reconfigure one or more of the corresponding radio access technology (RAT) upon allocation and release of a TFU availability window thus ensuring cease of spectrum use upon receipt of corresponding signaling. Control is then passed 462 to action 410 to await the running of an application at the MMD.

Figure 5:
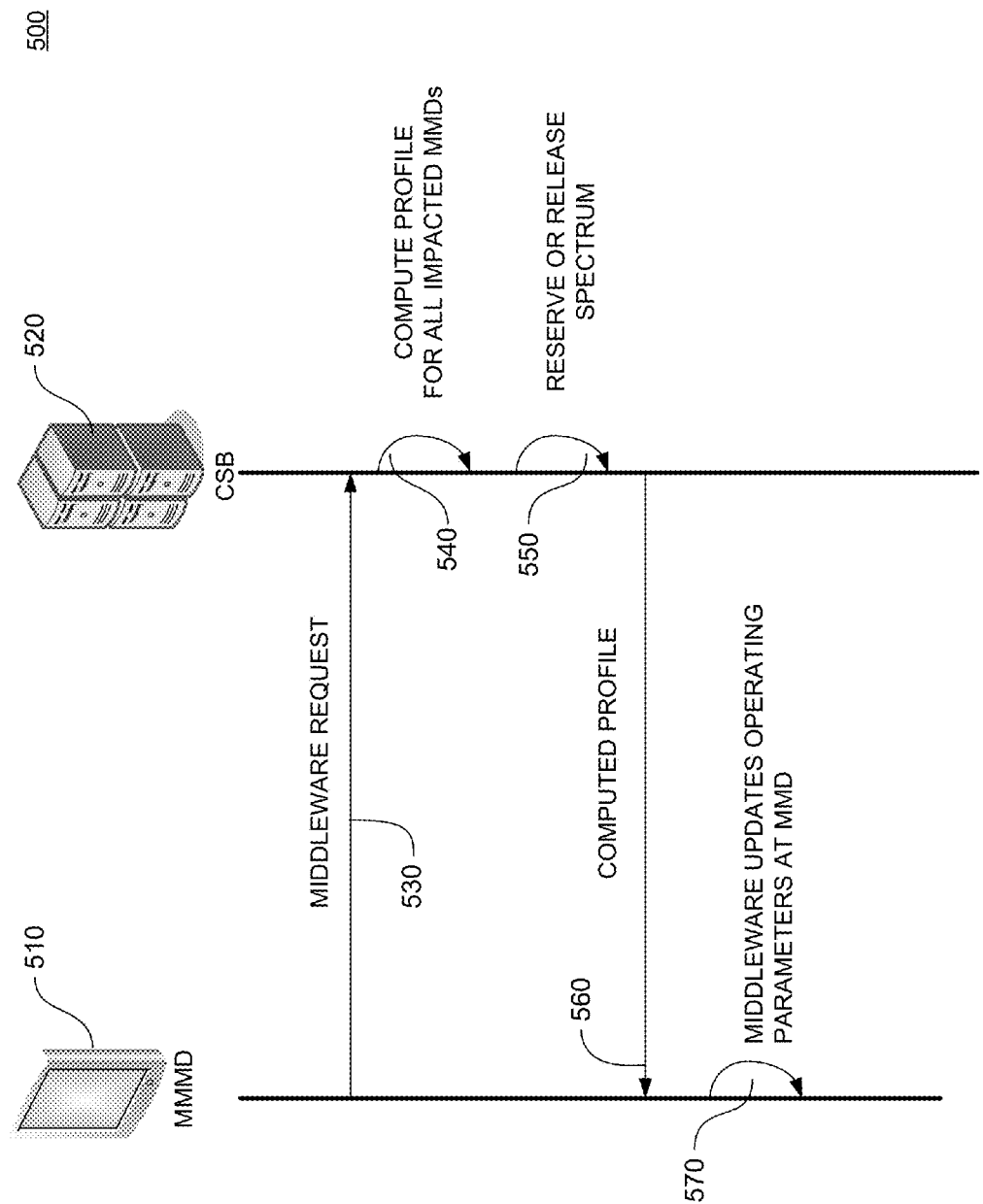
FIG. 5 is a flow diagram of a process that illustrates the message flow during establishment of a transaction between an MMD and a cloud spectrum broker in accordance to an embodiment.

FIG. 5 is a flow diagram of a process that illustrates the message flow during establishment of a transaction between an MMD and a cloud spectrum broker in accordance to an embodiment. A middleware layer provides intelligence in the device in managing the connectivity resources. With the concept of dynamic spectrum through the CSB, the middleware on the device allows for content tailoring and delivery of a better user experience by implementing smart context aware algorithms. The middleware layer at terminal 510 such as a multi-mode device may create a connection to a device 520 such as a CSB by sending a message 530 requesting, advertising and releasing of TFU availability windows. It should be noted that the middleware request 530 may combine multiple service request messages and send one aggregate spectrum request message to the CSB upon receiving the multiple service request messages, where the spectrum demand contained in the spectrum request message should be the sum of spectrum demands in the multiple service request messages. If the middleware request 530 sent from the MMD to the CSB further contains a spectrum type of services conducted by a network, the MMD may set different spectrum demand thresholds and spectrum request time intervals according to the spectrum type of services. The device 520 would process the request and compute a profile for all impacted MMDs 540. The device 520 like CSB then reserve or release spectrum 550 based on the request. If a request is for additional spectrum then the CSB will reserve the desired spectrum if it is part of the inventory as found in CSS database 111 or if a primary spectrum holder 107 is capable and willing to fulfill such a request. The device 520 would then broadcast 560 to the requesting MMD and all impacted MMDs the computed profile. A process 570 such as CSS middleware at the terminal 510 will then update the operating parameters and negotiate resource allocation with applications running on MMD on the basis of traffic priority. The CSS middleware at terminal 510 can use the computed profile and prioritized according to one or more parameters, such as the RATs to implement the computed profile from the CSB.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of an automated spectrum trading and the optimization of spectrum allocation have been described. Using the disclosed approach, efficient and productive use of spectrum may be made, while minimizing the procedural and transactional burdens on spectrum holders or spectrum users. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A multi-mode device (MMD) comprising:
   a collection of radio access technology to facilitate communication of one or more broadcast services in a broadcast network, wherein broadcast services comprises signals to communication using one or more wireless standard;
   a cloud spectrum service (CSS) middleware unit comprising a microprocessor manages dynamic spectrum access transaction state for the multi-mode device and
   wherein the CSS middleware unit is accessible by an application configured to consume the one or more broadcast services in a broadcast network;
   wherein the CSS middleware unit coordinates communication between hardware in the multi-mode device and applications executing in the multi-mode device;
   wherein the CSS middleware unit executes middleware programming selected from a group consisting of cloud spectrum services transaction component, security and trust component, MMD profile management component, pricing component, context awareness component, and a combination thereof;
   wherein if the cloud spectrum services transaction component perform functions selected from a group consisting of communicating with a cloud spectrum broker (CSB), communicating with a cloud spectrum database (CSD), requesting time frequency unit availability windows, releasing time frequency unit (TFU) availability windows, notifying the CSD of the availability of unused TFU or vacated TFU, and a combination thereof.

2. The multi-mode device in accordance to claim 1, wherein if the middleware programming selects the security and trust component then said component perform functions to authenticate transactions and ensure secure communication.

3. The multi-mode device in accordance to claim 2, wherein if the middleware programming selects the pricing component perform then said pricing component functions to set a bidding price per TFU for each TFU availability window requested by the MMD.

4. The multi-mode device in accordance to claim 3, wherein if the middleware programming selects the MMD profile management component then said MMD profile management component reconfigures the MMD and corresponding radio access technology (RAT) upon allocation and release of a TFU availability window.

5. The multi-mode device in accordance to claim 4, wherein if the middleware programming selects the context awareness component then said component observes and infers usage habits and preference to form a context aware usage profile for the MMD; and
   wherein the radio access technology conforms to a wireless standard selected from a group consisting of IMT standards (IMT-2000, IMT-Advanced), IEEE 802.11, IEEE 802.15, IEEE 802.16, IEEE 802.20, UMTS, GSM 850, GSM 900, GSM 1800, GSM 1900, GPRS, operating in non-IMT bands.

6. A method of operating a multi-mode device, comprising:
   using a collection of radio access technology to facilitate communication of one or more broadcast services in a broadcast network; managing, with a cloud spectrum service (CSS) middleware unit comprising a microprocessor in the multi- mode device (MMD), dynamic spectrum access transaction state by forming a context aware usage profile for the MMD so as to consume the one or more broadcast services in a broadcast network;
   wherein the CSS middleware unit coordinates communication between hardware in the multi-mode device and applications executing in the multi-mode device;
   wherein the CSS middleware unit executes middleware programming selected from a group consisting of cloud spectrum services transaction component, security and trust component, MMD profile management component, pricing component, context awareness component, and a combination thereof;
   wherein if the cloud spectrum services transaction component perform functions selected from a group consisting of communicating with a cloud spectrum broker (CSB), communicating with a cloud spectrum database (CSD), requesting time frequency unit availability windows, releasing time frequency unit (TFU) availability windows, notifying the CSD of the availability of unused TFU or vacated TFU, and a combination thereof.

7. The method of operating a multi-mode device in accordance to claim 6, wherein if the middleware programming selects the security and trust component then said component perform functions to authenticate transactions and ensure secure communication.

8. The method of operating a multi-mode device in accordance to claim 7, wherein if the middleware programming selects the pricing component then pricing component perform functions to set a bidding price per TFU for each TFU availability window requested by the MMD.

9. The method of operating a multi-mode device in accordance to claim 8, wherein if the middleware programming selects the MMD profile management component then said management component reconfigures the MMD and corresponding radio access technology (RAT) upon allocation and release of a TFU availability window.

10. The method of operating a multi-mode device in accordance to claim 9, wherein if the middleware programming selects the context awareness component then said context awareness component observes and infers usage habits and preference to form a context aware usage profile for the MMD.

* * * * *